US010739187B2

(12) United States Patent
Schnaare et al.

(10) Patent No.: US 10,739,187 B2
(45) Date of Patent: Aug. 11, 2020

(54) INDUSTRIAL AUDIO NOISE MONITORING SYSTEM

(71) Applicant: Rosemount Inc., Shakopee, MN (US)

(72) Inventors: Theodore H. Schnaare, Carver, MN (US); Cory Michael Robinson, Mayer, MN (US); Richard Louis Nelson, Chanhassen, MN (US)

(73) Assignee: ROSEMOUNT INC., Shakopee, MN (US)

( * ) Notice: Subject to any disclaimer, the term of this patent is extended or adjusted under 35 U.S.C. 154(b) by 0 days.

(21) Appl. No.: 14/587,141

(22) Filed: Dec. 31, 2014

(65) Prior Publication Data

US 2015/0350799 A1    Dec. 3, 2015

Related U.S. Application Data

(60) Provisional application No. 62/006,689, filed on Jun. 2, 2014.

(51) Int. Cl.
| | |
|---|---|
| *H04R 29/00* | (2006.01) |
| *G01H 3/12* | (2006.01) |
| *G08B 21/18* | (2006.01) |
| *G01H 3/14* | (2006.01) |

(52) U.S. Cl.
CPC .............. *G01H 3/12* (2013.01); *G08B 21/182* (2013.01); *H04R 29/00* (2013.01); *G01H 3/125* (2013.01); *G01H 3/14* (2013.01)

(58) Field of Classification Search
CPC ........ H04R 29/00; G08B 21/182; G10H 3/12; G10H 3/125; G10H 3/14; G01H 3/12; G01H 3/125; G01H 3/14

USPC .......................................... 381/56–58, 72–74
See application file for complete search history.

(56) References Cited

U.S. PATENT DOCUMENTS

| | | | |
|---|---|---|---|
| 6,804,513 B2 | 10/2004 | Okuya et al. | |
| 8,737,244 B2 | 5/2014 | Rotvold et al. | |
| 8,861,476 B2 | 10/2014 | Fujimoto et al. | |
| 8,886,229 B2 | 11/2014 | Nanda et al. | |

(Continued)

FOREIGN PATENT DOCUMENTS

| | | |
|---|---|---|
| CN | 1360238 | 7/2002 |
| CN | 2786574 | 6/2006 |

(Continued)

OTHER PUBLICATIONS

Notification of Transmittal of the International Searching Report and the Written Opinion of the International Searching Authority from PCT/US2015/027932, dated Aug. 20, 2015.

(Continued)

*Primary Examiner* — Ammar T Hamid
(74) *Attorney, Agent, or Firm* — Westman, Champlin & Koehler, P.A.

(57) ABSTRACT

A wireless field device for use in monitoring acoustic noise includes an acoustic sensor configured to sense acoustic noise. Processing circuitry coupled to the acoustic sensor is configured to identify a hazardous noise condition based upon the sensed acoustic noise and a personnel noise exposure standard. Output circuitry provides a warning output in response to an identified noise condition. A system is also provided which uses one or more acoustic sensors implemented in wireless field mounted monitors.

34 Claims, 10 Drawing Sheets

(56) References Cited

U.S. PATENT DOCUMENTS

| | | | |
|---|---|---|---|
| 2002/0081979 A1* | 6/2002 | Okuya | G01H 3/12 455/67.11 |
| 2005/0141465 A1 | 6/2005 | Kato et al. | |
| 2006/0219015 A1* | 10/2006 | Kardous | G01H 3/06 73/645 |
| 2009/0180629 A1* | 7/2009 | Sander | H04M 1/05 381/58 |
| 2010/0135502 A1* | 6/2010 | Keady | A61B 5/121 381/58 |
| 2012/0163616 A1* | 6/2012 | Birch | H04R 1/1066 381/74 |
| 2012/0321097 A1* | 12/2012 | Braho | H04R 1/10 381/74 |

FOREIGN PATENT DOCUMENTS

| | | | |
|---|---|---|---|
| JP | 2000-009527 | 1/2000 | |
| JP | 2005-184727 | 7/2005 | |
| JP | 2005-274509 | 10/2005 | |
| JP | 2007-232561 | 9/2007 | |
| JP | 2010-505370 | 2/2010 | |
| JP | 2012132900 | 7/2012 | |
| JP | 2012-147298 | 8/2012 | |
| JP | 2013-544473 | 12/2013 | |
| WO | WO 2005/073680 | 8/2005 | |
| WO | WO-2005073680 A1 * | 8/2005 | G01H 3/00 |
| WO | WO 2005073680 A1 * | 8/2005 | G01H 3/00 |
| WO | WO 2013/074234 | 5/2013 | |
| WO | 2014/197542 | 12/2014 | |

OTHER PUBLICATIONS

"SoundAlert—High Noise Level Warning", Website: https://www.noisemeters.com/product/soundalert/apps.asp, Oct. 27, 2014.
"PulsarSafeEar: Maintaining a Safe Working Environment", Website: http://www.pulsarsafeear.com/noise-measurement-and-hearing-protection-in-factories.php, Oct. 27, 2014.
Office Action from Australian Patent Application No. 2015268845 dated Jul. 22, 2017.
Office Action from Chinese Patent Application No. 201510204940.7 dated Aug. 1, 2017.
Communication from European Patent Application No. 15725438.4, dated Jan. 11, 2017.
Office Action from Canadian Patent Application 2,950,903, dated Oct. 3, 2017, 4 pages.
Office Action from Australian Patent Application No. 2015268845, dated Dec. 7, 2017.
Office Action from Mexican Patent Application No. MX/a/2016/015410, dated Sep. 16, 217.
Office Action from Japanese Patent Application No. 2016-570795, dated Oct. 31, 2017.
Office Action from Mexican Patent Application No. MX/a/2016/015410, dated Feb. 20, 2018, 3 pages.
Office Action from Canadian Patent Application No. 2,950,903, dated Jun. 26, 2018.
Office Action from Chinese Patent Application No. 201510204940.7, dated Apr. 10, 2018.
Office Action from Japanese Patent Application No. 2016-570795, dated Jul. 31, 2018.
Office Action from Chinese Patent Application No. 201510204940.7, dated Oct. 8, 2018.
Office Action from Canadian Patent Application No. 2,950,903, dated Mar. 8, 2019.
Reexamination Action from Chinese Patent Application No. 2015102049407, dated Jul. 18, 2019.
Examination Report from Australian Patent Application No. 2018206846, dated Jul. 26, 2019.
Examination Report from Indian Patent Application No. 201627038480, dated Sep. 26, 2019.
Trial and Appeal Decision from Japanese Application No. 2016-570795 (Appeal No. 2018-15424), dated Aug. 20, 2019, (machine translation).
Communication from European Patent Application No. 15725438.4, dated Apr. 6, 2020.
Examination Report No. 2 from Australian Patent Application No. 2018206846, dated Apr. 14, 2020.

* cited by examiner

| OCTAVE BAND FILTERS (HZ) | | |
|---|---|---|
| Lower Band Limit | Center Band (Geometric Mean) | Upper Band Limit |
| 22 | 31.5 | 44 |
| 44 | 63 | 88 |
| 88 | 125 | 177 |
| 177 | 250 | 354 |
| 354 | 500 | 707 |
| 707 | 1,000 | 1,414 |
| 1,414 | 2,000 | 2,828 |
| 2,828 | 4,000 | 5,656 |
| 5,656 | 8,000 | 11,312 |

INDUSTRIAL AUDIO NOISE MONITORING SYSTEM

CROSS REFERENCE TO RELATED APPLICATION

The present application is based on and claims the benefit of U.S. provisional patent application Ser. No. 62/006,689, filed Jun. 2, 2014, the content of which is hereby incorporated by reference in its entirety.

BACKGROUND

The present invention relates to an industrial wireless audio noise monitoring system that will monitor industrial plants to preferably operate at desired noise levels and ensure compliance with workplace safety regulations.

Industrial plants are used in the manufacture, storage and transportation of many types of goods. In such an industrial manufacturing environment, noise levels can reach relatively high levels. For any number of reasons, it may be desirable to maintain noise levels below a particular threshold. This can be achieved by manually inspecting particular areas of the industrial process using noise monitoring equipment. However, this is inefficient and only provides relevant noise level information during the time of a particular inspection. Thus, an excessive noise event may occur without being noted and the operator may be unaware of the problem.

SUMMARY

A wireless field device for use in monitoring acoustic noise includes an acoustic sensor configured to sense acoustic noise. Processing circuitry coupled to the acoustic sensor is configured to identify a hazardous noise condition based upon the sensed acoustic noise and a personnel noise exposure standard. Output circuitry provides a warning output in response to an identified noise condition. A system is also provided which uses one or more acoustic sensors implemented in wireless field mounted monitors.

This Summary and the Abstract are provided to introduce a selection of concepts in a simplified form that are further described below in the Detailed Description. The Summary and the Abstract are not intended to identify key features or essential features of the claimed subject matter, nor are they intended to be used as an aid in determining the scope of the claimed subject matter.

DETAILED DESCRIPTION OF ILLUSTRATIVE EMBODIMENTS

A system for industrial operators that require wireless, battery or otherwise self-powered, continuous monitoring of noise levels in challenging environments such as industrial settings including offshore oil and gas production platforms is provided. Measurements can be made in accordance with accepted personnel noise exposure standards for workplace noise monitoring. Information provided by the system allows operators to identify areas with excessive noise presenting a hazard to employees. Based upon this identification, operators can implement effective mitigations such as noise reduction, engineering and administrative controls, and appropriate personal protective equipment.

Embodiments of the invention include a wireless wide area audio monitoring network and software tools that allow operators to identify noise hazards within their facilities. In one embodiment, a noise monitoring system is comprised of a network of field mountable noise level monitors (preferably IEC 62591 compliant (WirelessHART®) devices. The noise level monitors are suitable for permanent installation in challenging, hazardous environments. The field mountable monitors integrate seamlessly into existing WirelessHART® (or other wireless protocol) networks deployed in the area to be monitored. Noise measurement functionality, accuracy, and reporting are in accordance with applicable workplace noise monitoring standards.

The system in one embodiment includes application software with noise level trending, mapping, and alerting functionality to help users identify and mitigate workplace noise hazards. Embodiments of the system also support fast and easy data integration into existing host systems.

Figure 2:
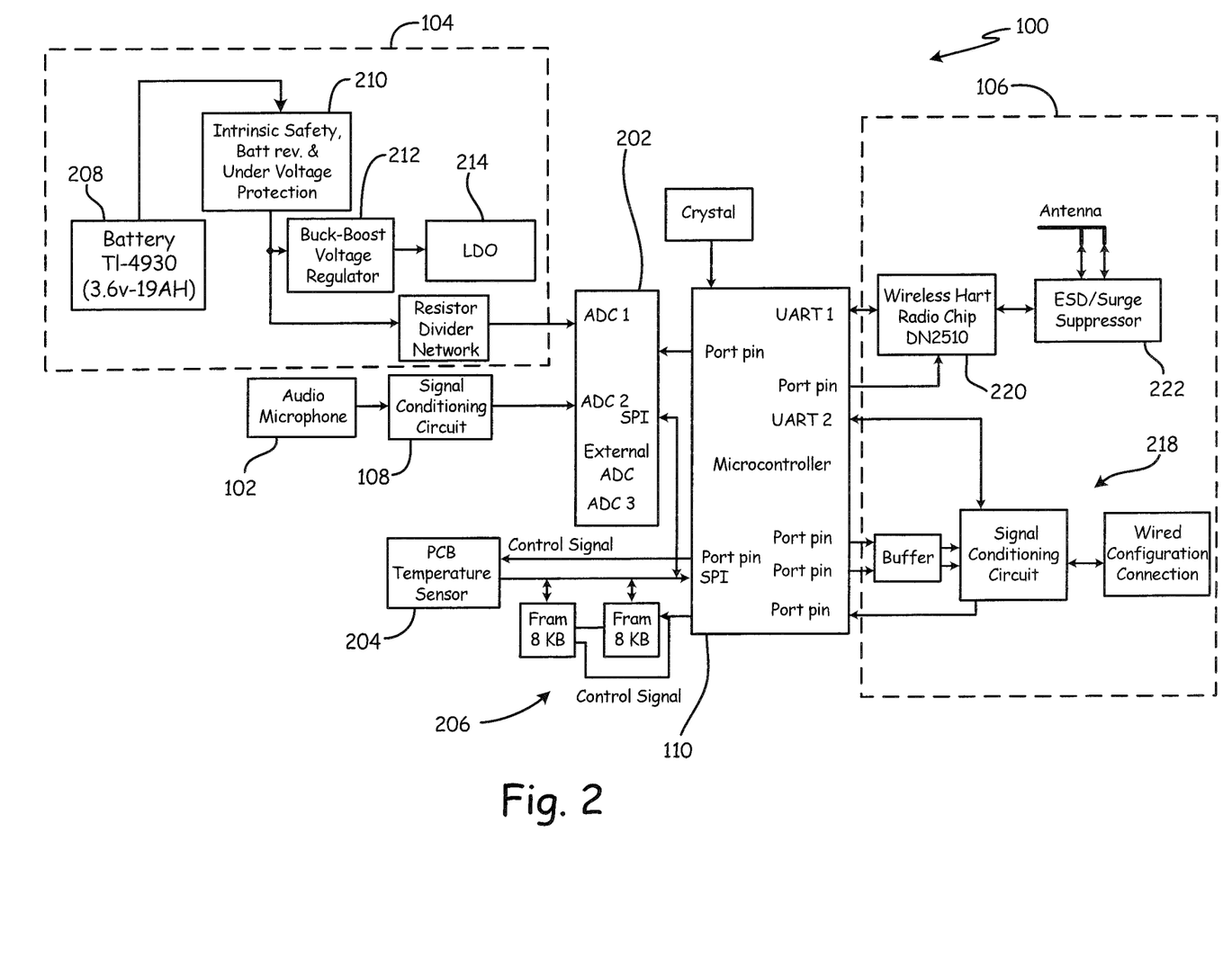
FIG. 2 is a simplified block diagram showing electrical components of the system of FIG. 1.
Figure 3:
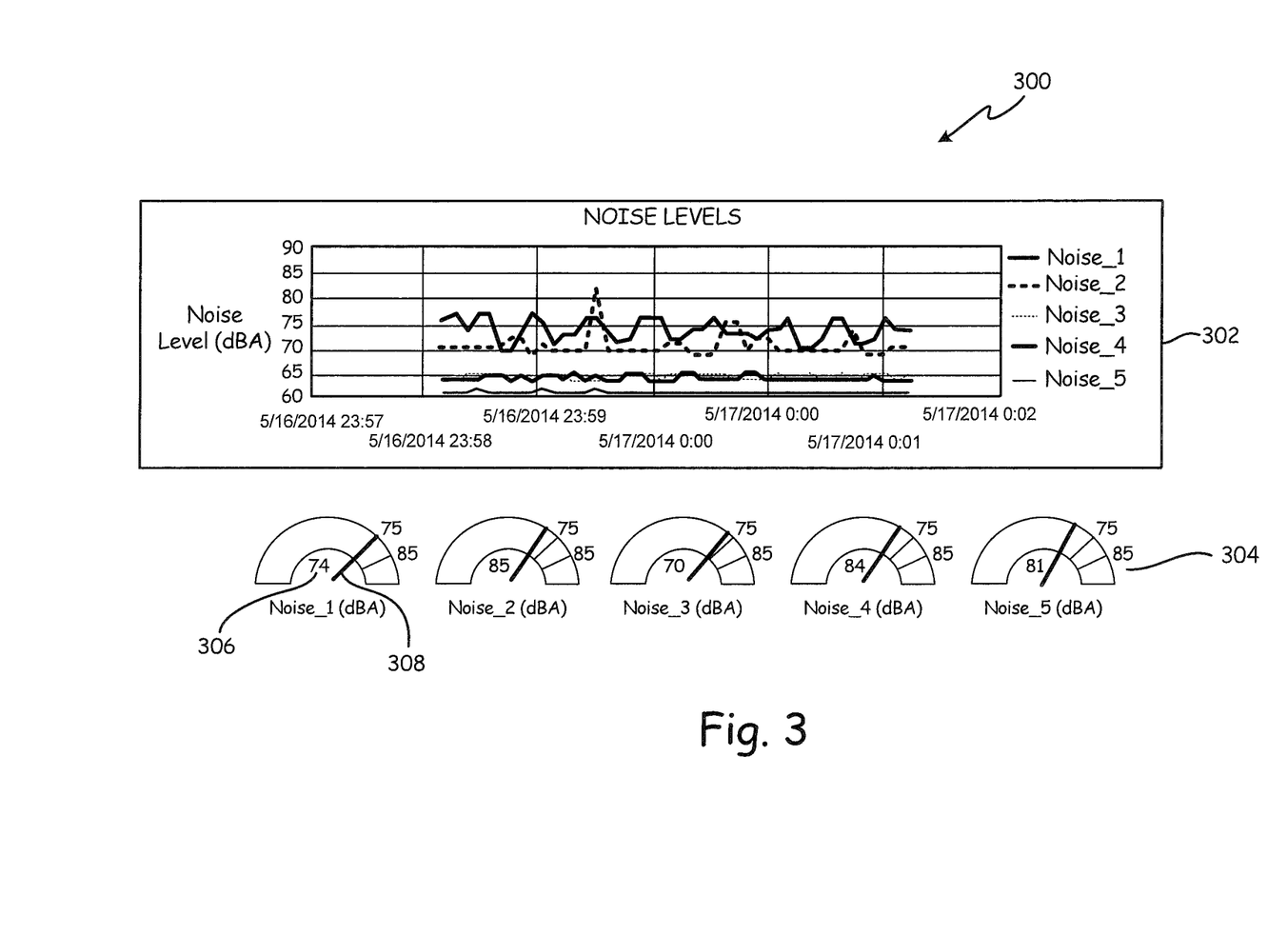
FIG. 3 is a graphical illustration of sensed noise levels provided as a user interface reporting audio noise and trending.

Field mountable monitors 100 (FIG. 1) include in one embodiment an audio microphone (or other acoustic sensor) 102, signal conditioning and filtering components 108 (shown in FIGS. 2 and 6), power supply 104, radio or communication module 106, and microcontroller 110 (shown in FIGS. 2 and 6) for managing the system and processing the audio data into one or more process variables that the customer's host system and/or associated application software can use for noise trending, mapping, and alerting. FIG. 2 shows an example block diagram for the field mountable audio noise monitor 100. FIG. 3 shows an example user interface featuring audio noise reporting and trending.

Figure 1:
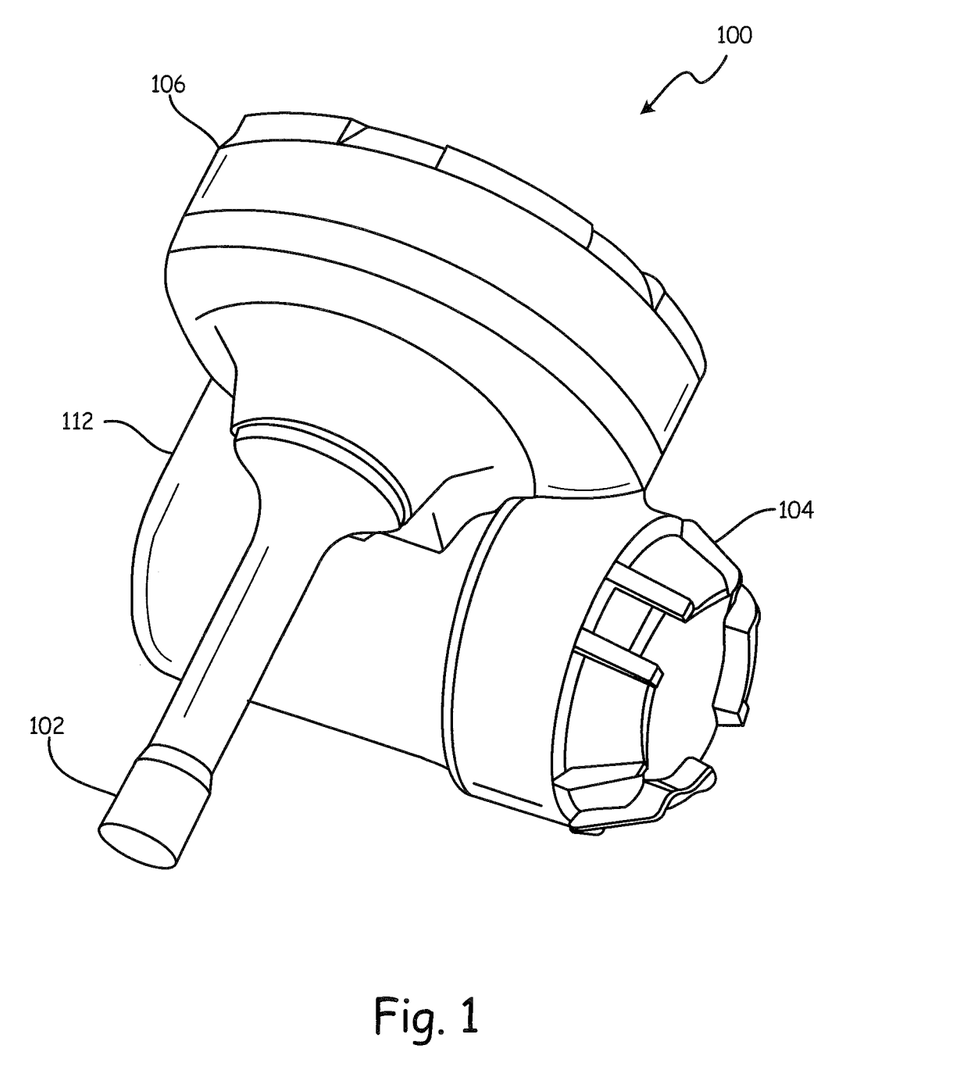
FIG. 1 is a perspective view of a field mountable industrial wireless audio noise monitoring system.
Figure 6:
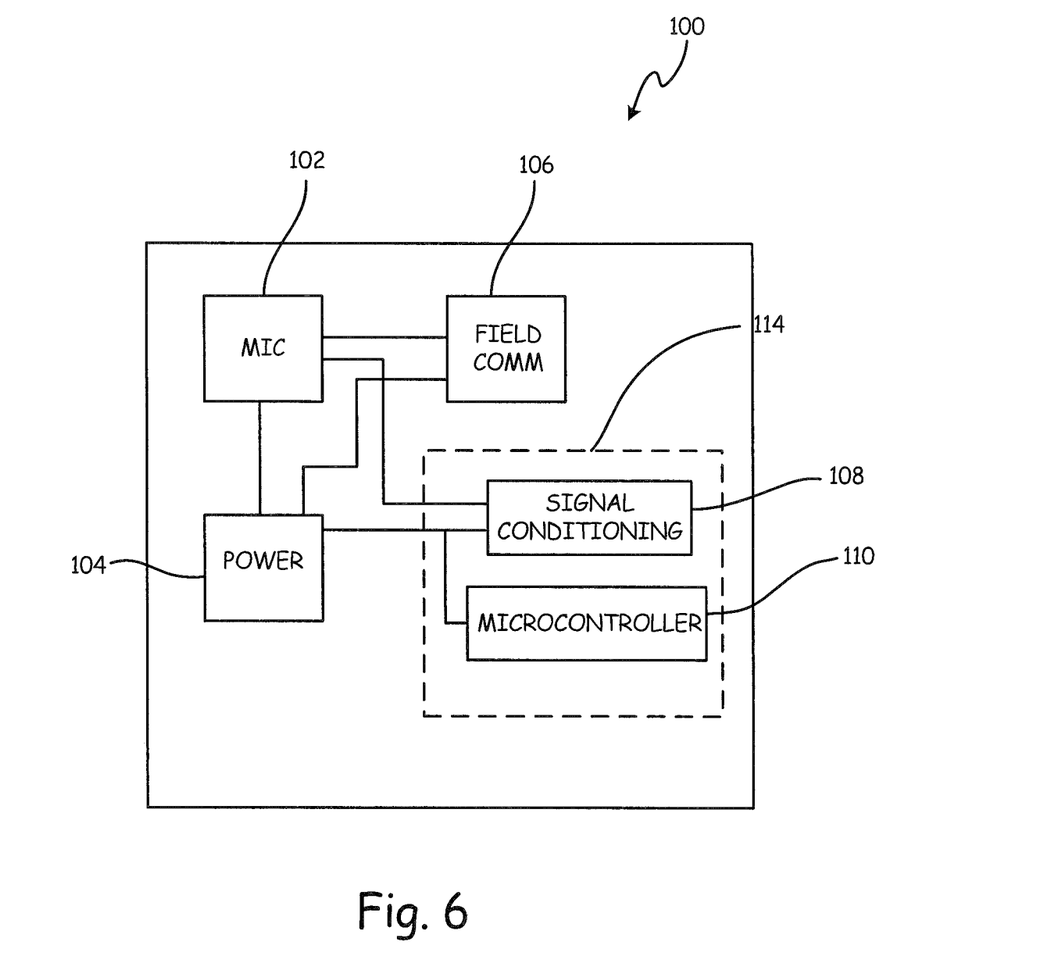
FIG. 6 is a simplified block diagram showing electrical components of a noise monitor according to an embodiment of the present disclosure.

A field device 100, configured in one embodiment as a wireless audio noise monitor, is shown in perspective in FIG. 1, and in basic block diagram form in FIG. 6. Referring to FIGS. 1 and 6, the noise monitor comprises an acoustic sensor such as a microphone 102, a power module 104, and a communication module 106 coupled to a system housing 112. Housing 112 also contains internal electronics 114 that include in one embodiment signal conditioning and filtering components 108 and microcontroller 110, and may in one embodiment be integrated with the communications module 106. The acoustic sensor receives acoustic input, and transmits the received acoustic input to signal conditioning and filtering circuit 108. Signal conditioning and filtering are discussed further below. Once the acoustic signal is filtered and conditioned, microcontroller 110 in one embodiment processes the filtered input for provision of processed audio data to a user interface or software module for display and/or analysis of information regarding received noise levels, audio mapping, specific event identification, alarm conditions, trending, and the like. Received noise may also be passed unfiltered and unconditioned to the microcontroller, and the microcontroller can perform conditioning in one embodiment. The acoustic sensor in one embodiment is capable of receiving noise outside the frequency range of human detection, such as ultrasonic noise.

FIG. 2 is a more detailed block diagram of a respective field device 100 according to one embodiment. Audio microphone 102 is coupled to pass a received audio signal to signal conditioning circuit 108, which in one embodiment includes weighting and filtering functions as discussed herein. Power module 104 is provided for powering components of the field device 100. Communications module 106 provides communication capabilities of the field device 100 to external locations such as a central station, control room, or the like, via a wired or wireless connection. Microcontroller 110 is coupled to signal conditioning circuit 108 via analog to digital converter block 202. Preferably, a temperature sensor 204 is coupled to microcontroller 110 to provide a temperature at the field device to the microcontroller. Temperature may be used in various calculations as will be described further herein. Microcontroller 110 has in one embodiment access to memory, such as FRAM 206. FRAM typically consumes much less power than other forms of memory, and is well suited for use in field devices such as field device 100 having low power output.

Power module 104 in one embodiment, includes at least one battery 208, an intrinsic safety circuitry 210, a "buck-boost" type voltage regulator 212, a low-dropout (LDO) regulator, and a resistive power divider such as resistor divider network 216. The power module supplies at least some of the power used to power the field device 100, and provides an intrinsically safe power solution for the field device 100. Components of the power module are provided separately in one embodiment.

Communications module 106 is in one embodiment configured for operation using HART® (a hybrid physical layer consisting of digital communication signals superimposed on a standard 4-20 mA analog signal), FOUNDATION™ Fieldbus (an all-digital communication protocol promulgated by the Instrument Society of America in 1992), Profibus communication protocol, or others. Wireless process control loop protocols, such as radio-frequency communication techniques including IEC 62591 (WirelessHART®), may also be implemented. In communications module 106, wired HART® communications circuitry 218 and WirelessHART® communications circuitry 220 are coupled to the microcontroller 110 for communication of parameters such as audio information to an external location. An electrostatic discharge and surge suppressor 222 may also be used in one embodiment for protection of the WirelessHART® circuitry 220.

Multiple noise monitors 100 may be positioned in a working or other area, such as oil rigs, off shore oil and gas production platforms, industrial plants, and the like. The monitors 100 are in some embodiments configured using, for example, wired or Wireless HART® enabled devices and are embedded in one embodiment into a mesh network, connected to a central station or control room. In one specific configuration, shown in block diagram form in FIG. 7, a system 700 of multiple noise monitors $100_1$, $100_2$, $100_3$, $100_4$ is configured to operate on a commercially proved industrial mesh network such as a WirelessHART® network. A plurality of noise monitors 100 are arrayed at a location to be monitored, and are in one embodiment part of a wireless network mesh 702 such as a WirelessHART® network. In one embodiment, the plurality of noise monitors are positioned at known locations. A central station 704 such as a gateway device is used in one embodiment of the system 700, and is connected with the mesh 702 to receive information from one or more of the plurality of noise monitors 100. The central station 704 may serve to transmit information from the noise monitors 100 to a local or remote monitoring or control system.

A field device 100 for use in monitoring acoustic noise in an industrial process therefore comprises in one embodiment an acoustic sensor configured to sense acoustic noise in the industrial process, processing circuitry coupled to the acoustic sensor configured to identify a noise condition related to a personnel noise exposure standard based upon the sensed acoustic noise, and output circuitry configured to provide an output in response to the noise condition. In one embodiment, the field device is used to monitor noise based upon a personnel noise exposure standard exemplified by a hazardous noise condition such as a specific noise event, a sustained noise level at or above a certain level, or a trend of noise that is trending toward a hazardous noise condition.

Figure 7:
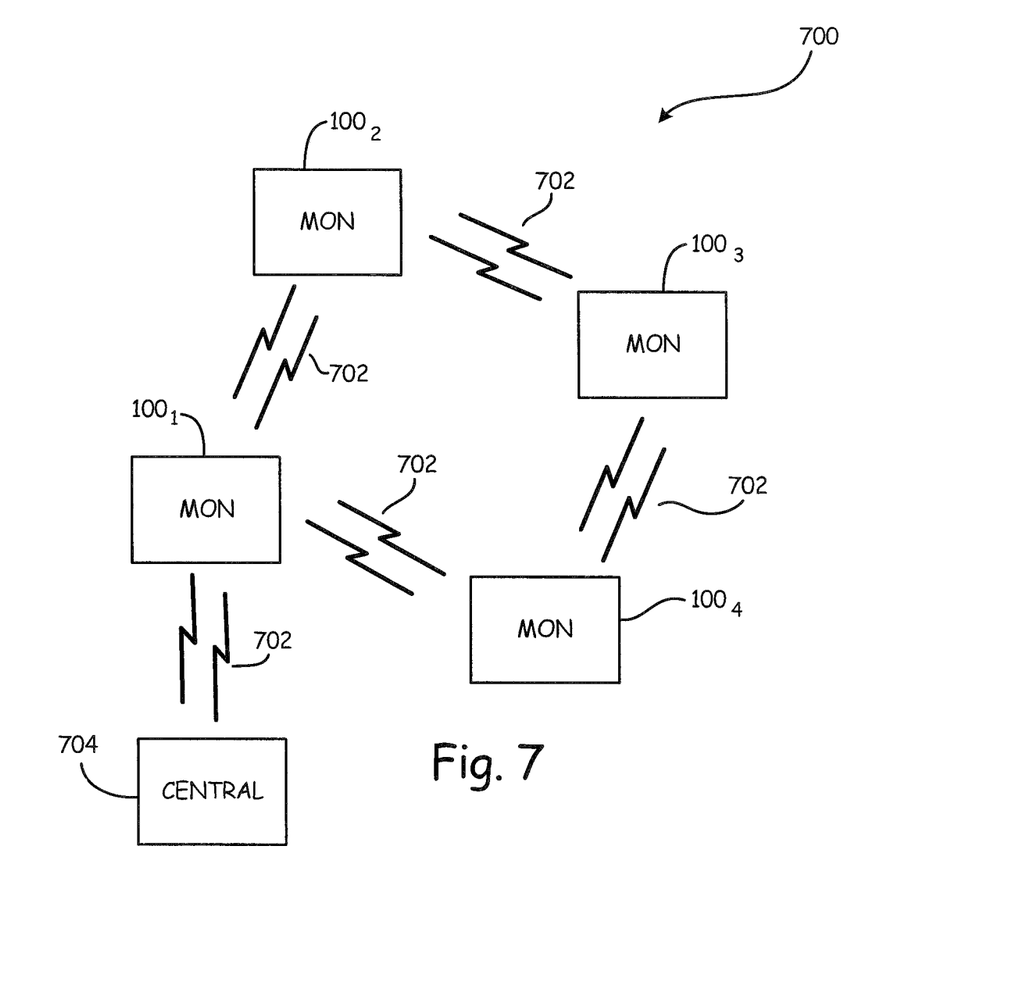
FIG. 7 is a block diagram of a system according to an embodiment of the present disclosure.
Figure 8:
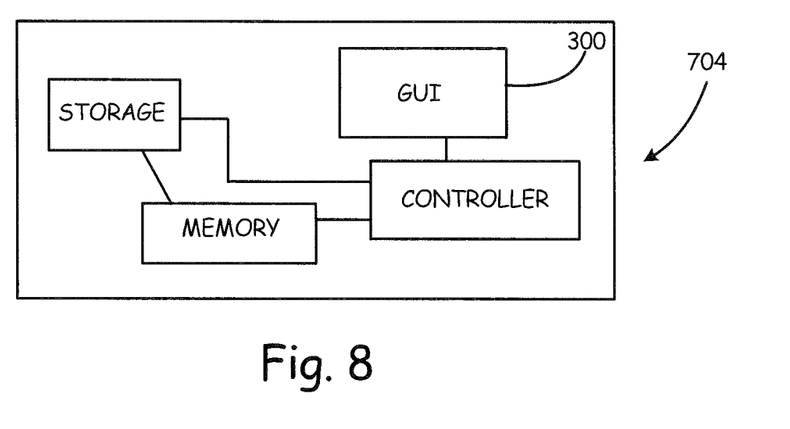
FIG. 8 is a block diagram of a central station according to an embodiment of the present disclosure.

Information regarding noise levels at the one or more noise monitors is conveyed in one embodiment over the mesh network 702 for further noise level trending, mapping, and alerting functionality within a software module, a user interface of the software module, or a combination of the software module and user interface. One embodiment of a user interface 300 for audio noise reporting, trending, and the like is shown in FIG. 3. For example, the user interface 300 may be used to show noise levels over time, for one or more specific noises, one or more specific monitors, or some combination thereof. As shown in FIG. 3, user interface 300 includes in one embodiment a graph 302 and visual meter-type displays 304 showing in meter form at least some of the information shown in historical form on the graph 302, or an amalgamation of that information.

Graph 302 shows instantaneous noise levels over a period of time for each of five separate identified noises. The five separate identified noises may be noise levels within a frequency range or band, noises from individual noise monitors, or the like. Graph 302 is user selectable in what is displayed, for example showing in various embodiments one or more of current levels over time, average levels over time, range bands, or predictive trending information such as regression curves or the like.

Meter display 304 for Noise_1 is shown as an A-weighted decibel reading, and indicates two pieces of information, a noise level 306 indicating 74 dBA and a meter level 308 of approximately 75 dBA. The noise level 306 may indicate in various embodiments an average noise level over a given time period, a current noise level, a peak noise level, a local maximum or minimum noise level, or the like. The meter level 308 may indicate in various embodiments an average noise level over a given time period, a current noise level, a peak noise level, a local maximum or minimum noise level, or the like. In one embodiment, a user may select the form of the display, choosing for example from a list of possible display configurations including what information is displayed, and in what form the information is displayed (i.e., a graph such as graph 302, meter displays such as displays 304, combinations of displays and graphs, charts, tables, or the like).

The user interface 300 serves in one embodiment as a front end for software that collects the audio information received by the noise monitors, and performs functions including but not limited to noise trending, alerting to certain events or trends, and noise mapping. The user interface 300 allows a user to choose a variety of options for presentation of the noise information, including selection of a particular noise monitor or monitors of a plurality of noise monitors, a particular noise or noises of a plurality of noises, a noise or noises within a frequency range or ranges, a noise or noises weighted with weighting filters or filtered by frequency, a monitor or monitors weighted with weighting filters or filtered by frequency, a hazardous noise condition as determined by one or more criteria such as a personnel noise exposure standard, and the like. Further, a duration for monitoring for trends, mapping, or the like may be selected by a user.

In one embodiment, once a user selection of one or more of weighting choice, filtering choice, noise monitor location choice, type of noise choice, duration of noise, duration of trending, threshold noise intensity or frequency choice, and the like are made, the software displays on the user interface 300 graphs, charts, meters, or the like, also user selectable, to show selected criteria. Upon a determination by the software that a predetermined threshold of any of the criteria is reached (for example based upon a personnel noise exposure standard), a warning or other alert is provided by the software. The warning or alert may be in the form of a display on the user interface 300, an audio alarm, a digital signal that may be used by an external alerting system, or some combination thereof.

Noise trends may be identified based on any number of predetermined criteria, including for example only and not by way of limitation, an increasing noise level, an average noise level over a threshold, a weighted average noise level above a threshold, or the like. These may also be used to indicate a personnel noise exposure standard limit may be reached and issue a preemptive warning.

Determination of a location where a noise originated may also be performed, for example by identifying the closest noise monitor to a noise based on differences at different noise monitors, or the time the noise was received at one or more noise monitors having known locations.

Noise detector averaging time is provided as user selectable for slow, fast, and impulse settings, as such are known in the art. The sampling and transmit period may also user selectable.

Figure 4:
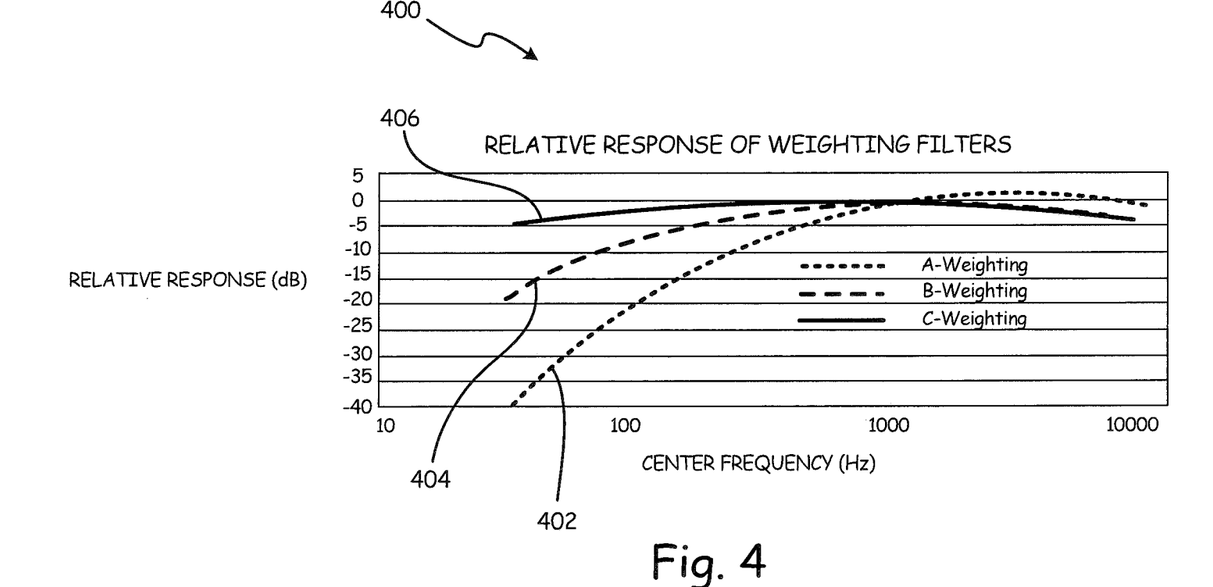
FIG. 4 is a graph of relative response versus center frequency of weighting filters for sensing A, B and C type audio noise.

A graph 400 of weighting curves for A-weighting 402, B-weighting 404, and C-weighting 406 are shown for a frequency range of approximately 20 Hz to 10 kHz in FIG. 4. Traditional weighting curves for frequency responses are known in the art. While A-, B-, and C-weightings are shown in FIG. 4, typically A- and C-weighting are the most commonly used filters in industrial noise applications, with A-weighting being mandated (such as the international standard IEC 61672) for use in sound level meters nearly worldwide. C-weighting is a closer approximation of the human ear, although A-weighting allows comparison to older standard noise levels, C-weighting is considered to be the best predictor of the human ear's sensitivity to tones at high noise levels. A-weighting better reflects the potential for damage to the human ear due to noise. While A-, B-, C-, and D-weightings are discussed, additional filtering or weighting such as Z-weighting or other weighting functions, or linear (no filter) weighting may be used with embodiments of the present disclosure without departing from the scope thereof. The use of weighting curves is known, and is not further described herein. Further, other personnel noise exposure standard may also be used.

Figure 5:
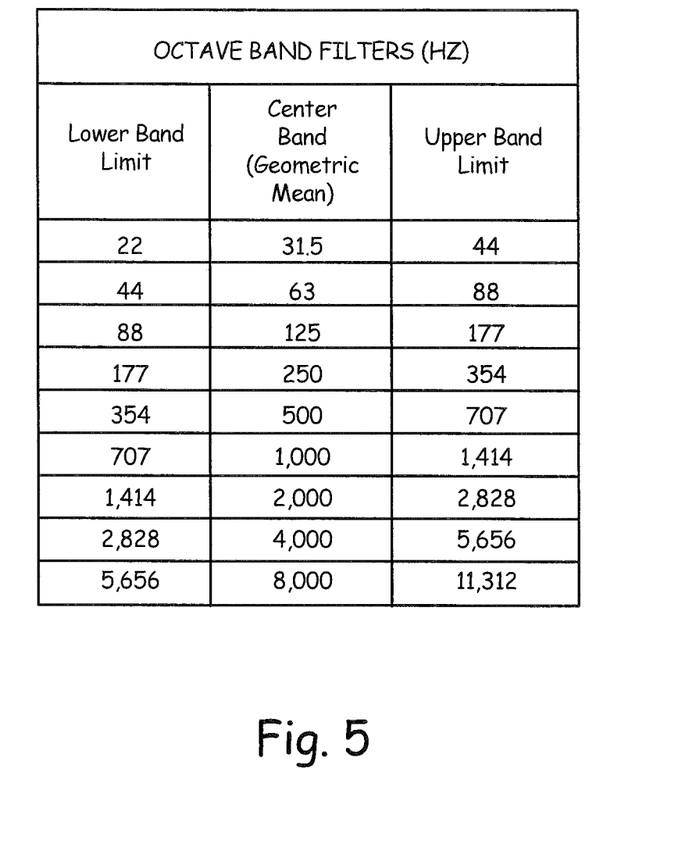
FIG. 5 is a Table illustrating octave band filters.

As noises that are damaging to human ears are dependent both on intensity and frequency, in some embodiments, filtering based on frequency is used to isolate certain noise and noise patterns. One method of frequency filtering is through the use of octave bands. Octave bands break the frequency spectrum into bands in which the top frequency is twice that of the low frequency. Traditional octave bands with high and low frequencies and center frequencies are shown in table form in FIG. 5. Since sounds in certain frequency ranges are more likely to cause potential hearing damage, it may be desirable to focus on sounds within those frequency ranges. Octave band filters filter out sounds that are not in their band or frequency range. Embodiments of the present disclosure may use octave band filtering in the signal conditioning circuit 108, for example. While octave band filtering is discussed, it should be understood that other frequency filtering such as one-third octave band filtering, is amenable for use with the embodiments of the present disclosure, and without departing from the scope thereof.

Filtering such as octave band filtering, and weighting such as A-, B-, C-, or D-weighting, or any combination thereof, may be used in various embodiments and with various parameters and functions such as trending, mapping, and the like, without departing from the scope of the disclosure. Such combinations are used in various embodiments to allow for flexibility in noise monitoring using the noise monitors described herein.

Further, for the identification of certain sounds, the use of octave band or other frequency filtering may be even more useful. In some industrial locations, certain known sounds may occur. Further, those sounds can have a distinct noise pattern, frequency, intensity, or combination thereof, allowing for the identification of sounds through use of the signal conditioning and filtering and processed by the microcontroller, for example referencing against a known noise pattern table or database. Still further, certain noise events may be precursors to other potential events, and may be used to alert operators or users of an impending condition, such as a hazardous condition or the like.

Figure 9:
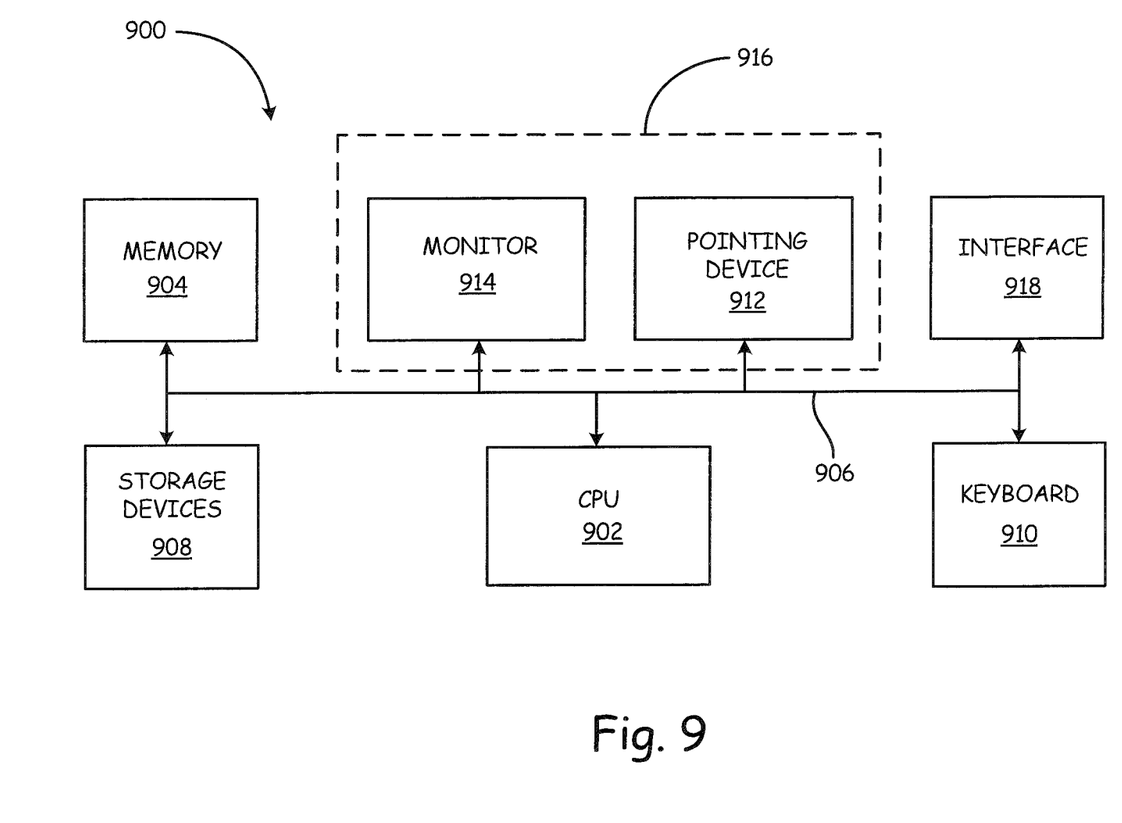
FIG. 9 is schematic view of a computer on which embodiments of the present disclosure may be practiced.

FIG. 9 and the related discussion provide a brief, general description of a suitable computing environment in which the software and user interface 300 can be implemented. Although not required, the software can be implemented at least in part, in the general context of computer-executable instructions, such as program modules, being executed by a computer 900. Generally, program modules include routine programs, objects, components, data structures, etc., which perform particular tasks or implement particular abstract data types. Those skilled in the art can implement the description herein as computer-executable instructions storable on a computer readable medium. Moreover, those skilled in the art will appreciate that the invention may be practiced with other computer system configurations, including multi-processor systems, networked personal computers, mini computers, main frame computers, and the like. Aspects of the invention may also be practiced in distributed computing environments where tasks are performed by remote processing devices that are linked through a communications network. In a distributed computer environment, program modules may be located in both local and remote memory storage devices.

The computer 900 comprises a conventional computer having a central processing unit (CPU) 902, memory 904 and a system bus 906, which couples various system components, including memory 904 to the CPU 902. The system bus 906 may be any of several types of bus structures including a memory bus or a memory controller, a peripheral bus, and a local bus using any of a variety of bus architectures. The memory 904 includes read only memory (ROM) and random access memory (RAM). A basic input/output (BIOS) containing the basic routine that helps to transfer information between elements within the computer 900, such as during start-up, is stored in ROM. Storage devices 908, such as a hard disk, a floppy disk drive, an optical disk drive, etc., are coupled to the system bus 906 and are used for storage of programs and data. It should be appreciated by those skilled in the art that other types of computer readable media that are accessible by a computer, such as magnetic cassettes, flash memory cards, digital video disks, random access memories, read only memories, and the like, may also be used as storage devices. Commonly, programs are loaded into memory 904 from at least one of the storage devices 908 with or without accompanying data.

Input devices such as a keyboard 910 and/or pointing device (e.g. mouse, joystick(s)) 912, or the like, allow the user to provide commands to the computer 900. A monitor 914 or other type of output device can be further connected to the system bus 906 via a suitable interface and can provide feedback to the user and also display the user interface 300. If the monitor 914 is a touch screen, the pointing device 912 can be incorporated therewith. The monitor 914 and input pointing device 912 such as mouse together with corresponding software drivers can form a graphical user interface (GUI) 916 for computer 900. Interfaces 918 allow communication to other computer systems if necessary. Interfaces 918 also represent circuitry used to send signals to or receive signals from the actuators and/or sensing devices mentioned above. Commonly, such circuitry comprises digital-to-analog (D/A) and analog-to-digital (A/D) converters as is well known in the art.

In operation, a noise monitor or plurality of noise monitors such as monitors 100 described above are placed in an area where acoustic noise is to be measured. The one or more noise monitors sense the acoustic noise in the area. The noise is processed based upon a personnel noise exposure standard, in one embodiment within the noise monitor, but in alternative embodiments, within processing circuitry or a microcontroller. Processing includes, by way of example only and not by way of limitation, filtering or weighting the sensed noise based on one or more criteria. A noise parameter or multiple noise parameters are determined, based on the received, processed acoustic noise. In one embodiment, the noise parameters are displayed on a user interface, for example a user interface of a software module as described herein, and the software module is configured to display trending, mapping, location information, specific sound identification, and the like according to user selected criteria. In various configurations, the user interface may be carried on the noise monitor itself and/or at another location such as central location 704 shown in FIG. 7.

Figure 10:
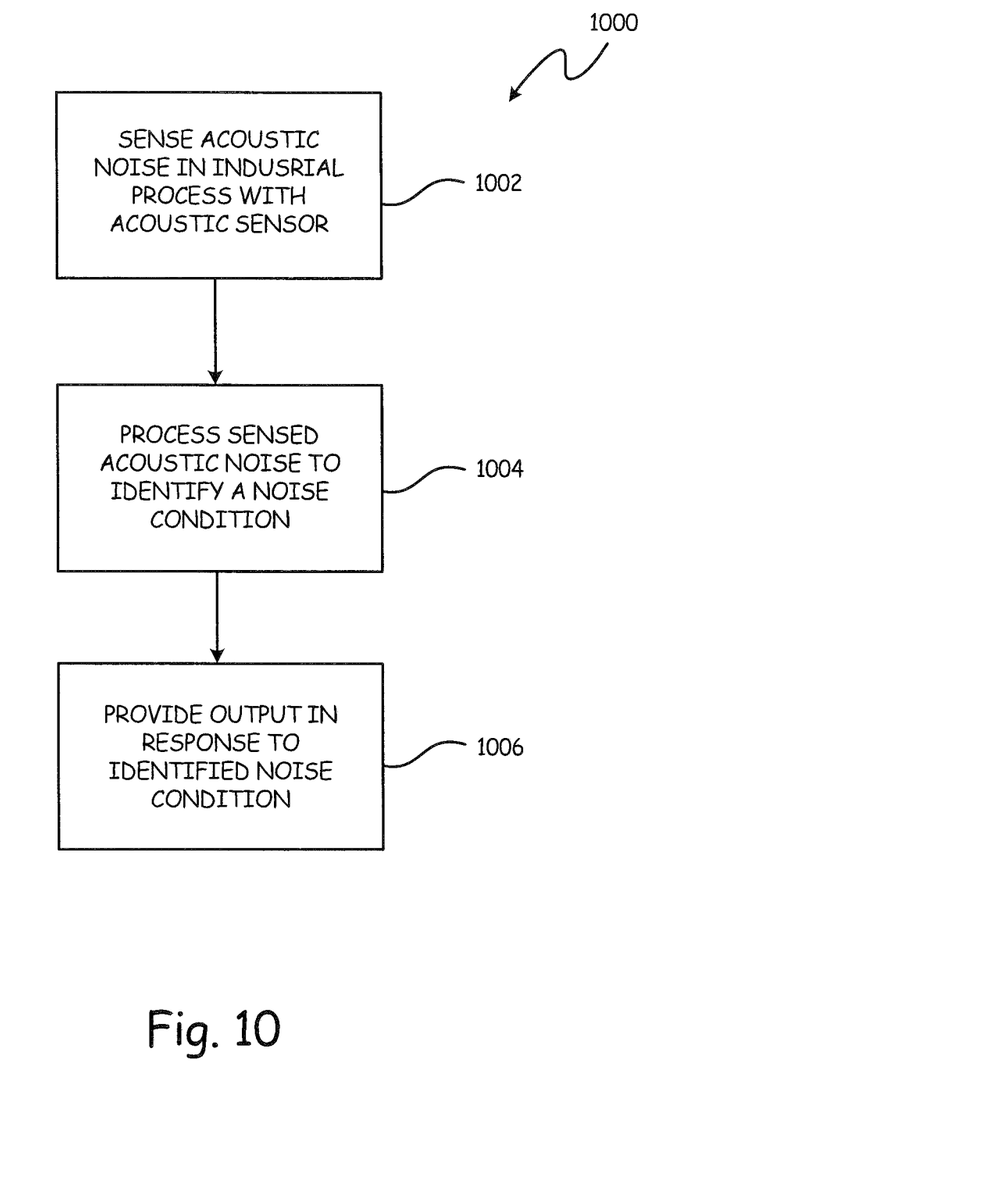
FIG. 10 is a flow chart diagram of a method according to an embodiment of the present disclosure.

A method for monitoring acoustic noise in an industrial process is shown in flow chart form in FIG. 10. Method 100 comprises, in one embodiment, sensing acoustic noise in the industrial process with an acoustic sensor in block 1002, processing the sensed acoustic noise to identify a noise condition in block 1004, and providing an output in response to the identified noise condition in block 1006. In one embodiment, the method processes noise to identify a hazardous noise condition such as a specific noise event, a sustained noise level at or above a certain level, or a trend of noise that is trending toward a hazardous noise condition.

Processing may comprise, in various embodiments, filtering the noise by frequency, such as by using octave bands as described above, weighting the sensed noise using a weighting curve such as A-, B-, C-, or D-weighting as described above. Identifying a noise parameter in one embodiment further comprises configuring the processing using at least one criterion, such as weighting choice, filtering choice, noise monitor location choice, type of noise choice, duration of noise, duration of trending, threshold noise intensity or frequency choice, and the like.

The specific audio measurement characteristics and features can be configured as desired. This includes the particular standards used, the frequency range, the amplitude range, as well as user selectable weighting. For example, certain standard weighting factors can be used for detecting hazardous noise conditions including weighting standards A, B, C and D. Example characteristics may be as follows:
Accuracy: IEC 61672 Class 2 (or better)
Frequency Range: 20 Hz to 20 kHz
Amplitude Range: 60 to 120 dB
Measurement Modes: Broadband with user-selectable weighting: A, B, C or D
Octave with standard band filtering
Time Response: User selectable: Slow, Fast, Impulse
Sampling/transmit period: User selectable: 4 seconds to 60 minutes
Level triggered sampling and transmit Example weighting filters are illustrated in the graph of FIG. 4 and the Table of FIG. 5. Additionally, as noted above, the response time and sampling period may be selectable including level triggered sampling.

In various aspects, the invention includes:
A field mountable industrial wireless audio noise monitor device using self-organizing mesh network technology.
A field mountable industrial wireless audio noise monitoring device employing various standard personnel noise exposure standard spectral weighting characteristics (known in the industry as A, B, C, and D weightings) that are required to comply with workplace noise monitoring standards.
A field mountable industrial wireless audio noise monitoring device employing octave band filtering in compliance with industry accepted workplace noise monitoring standards.
A field mountable industrial wireless audio noise monitoring device where broad spectrum audio noise is monitored and reported simultaneously with A, B, C and D filtering applied as well as noise levels with octave filtering applied.
A field mountable industrial wireless audio noise monitoring device with user configurable noise alerting levels.
A field mountable industrial wireless audio noise monitoring device which transmits noise level data only when the sensed audio noise level exceeds a user configured threshold value.
Application software that collects audio noise level data from field mounted monitors via the wireless network and provides users with noise trending, alerting, and mapping functions Although the present invention has been described with reference to preferred embodiments, workers skilled in the art will recognize that changes may be made in form and detail without departing from the spirit and scope of the invention. The particular noise being sensed may be ultrasonic noise. As used herein, the term "acoustic" includes both ultrasonic noise as well as noise which is within a typical human hearing spectrum, or within a frequency spectrum which is capable of damaging human hearing. Advanced spectral content analysis capabilities may be included. In such a configuration, specific sonic and ultrasonic events may be monitored in the output from the acoustic sensor. In some configurations, the system may include noise source locating abilities. For example, a directional microphone may be used and/or additional acoustic sensors. Location may be determined based upon signal strength and/or time delay of received acoustic signal. As used herein, the term "hazardous noise condition" includes any condition which may be selectable or defined by a user or other means and may be based upon a personnel noise exposure standard. Hazardous noise is noise having a characteristic which may be harmful to personnel exposed to such noise. The hazardous noise condition may be an impending condition and does not necessarily require that a hazardous level of noise be present at the time of detection. The system can provide some type of a warning output. This can be transmitted wirelessly to another location. Further, an output may be provided locally to alert users locally. Such an alert could be a visual indication or an audio indication. The alert may also be configured to automatically shut down noise producing equipment. Although a wireless configuration is described above, the system may also be implemented using wired technologies. For example, a two-wire industrial process control loop may be used. The system can implement power saving and/or power scavenging techniques in order to facilitate a wireless configuration.

What is claimed is:

1. A field mounted wireless field device for use in monitoring acoustic noise, comprising:
   an acoustic sensor, mounted on the wireless field device at an Industrial field mounted location, configured to sense acoustic noise;
   processing circuitry coupled to and positioned with the acoustic sensor configured to identify a specific hazardous noise condition based upon the sensed acoustic noise and a personnel noise exposure standard and to receive a signal corresponding to the sensed acoustic noise; and
   output circuitry configured to provide a warning output in response to an identified hazardous noise condition;
   wherein the wireless field device is organized in a self-organizing mesh network of devices and is configured to communicate wirelessly with the self-organizing mesh network using radio frequency signals; and
   wherein the processing circuitry is configured to identify the specific hazardous noise condition based on a user selectable noise duration.

2. The wireless field device of claim 1 wherein the output circuitry comprises wireless output circuitry.

3. The wireless field device of claim 2 wherein the wireless output circuitry is configured to operate in accordance with the IEC 62591 (WirelessHART®) Communication Standard.

4. The wireless field device of claim 1 including a battery configured to provide power to circuitry of the device.

5. The wireless field device of claim 1 wherein the processing circuitry is configured to filter the sensed acoustic noise based upon a weighting factor.

6. The wireless field device of claim 5 wherein the weighting factor is selected from the A, B, C and D noise standards.

7. The wireless field device of claim 5 wherein the weighting factor is user selectable.

8. The wireless field device of claim 1 wherein the acoustic sensor is configured to receive ultrasonic noise.

9. The wireless field device of claim 1 including application software which is configured to receive the warning output and provide trending information of the output indicating noise trending to a hazardous noise condition.

10. The wireless field device of claim 1 including application software which is configured to receive the warning output and provide alerting information.

11. The wireless field device of claim 1 including application software which is configured to receive the warning output and provides location information.

12. The wireless field device of claim 1 wherein the warning output comprises sensed noise information.

13. The wireless field device of claim 1 wherein the hazardous noise condition comprises the sensed acoustic noise exceeding a threshold.

14. The wireless field device of claim 13 wherein the threshold is user configurable.

15. The wireless field device of claim 1 wherein the processing circuitry employs octave band filtering.

16. The wireless field device of claim 15 wherein the octave band filtering is in compliance with industry accepted workplace noise monitoring standards.

17. The wireless field device of claim 1 including one or more second acoustic sensors, each configured to sense acoustic noise and generate a second signal corresponding to the sensed acoustic noise.

18. The wireless field device of claim 17 wherein the acoustic sensor and the one or more second acoustic sensors are used to provide noise location information based on the strengths of the first signal and the one or more second signals, and/or a time delay of receiving the first and second signals.

19. The wireless field device of claim 1 wherein the warning output comprises a local output.

20. A method for monitoring acoustic noise, comprising:
    sensing acoustic noise with a field mounted acoustic sensor at an industrial field mounted location;
    processing the sensed acoustic noise to identify a specific hazardous noise condition based upon a personnel noise exposure standard and a user selectable noise duration; and
    providing a wireless output in response to the identified hazardous noise condition;
    wherein sensed acoustic noise is received as a signal corresponding to the sensed acoustic noise, and is processed with field mounted monitors positioned with the field mounted acoustic sensor and is communicated via a self-organizing mesh network of field mounted acoustic sensors.

21. A system for monitoring noise in an industrial process, comprising:
    a plurality of acoustic sensors implemented in a plurality of field mounted monitors at a plurality of industrial field mounted locations, each acoustic sensor configured to sense acoustic noise in the industrial process;
    each of the plurality of field mounted monitors comprising processing circuitry positioned with its acoustic sensor at the field mounted location and configured to process the sensed acoustic noise, detect a specific hazardous noise condition based upon configurable parameters, and detect a location where a noise originated based on strengths of the sensed acoustic noise by the plurality of acoustic sensors and/or a time delay of the sensed acoustic noise by the plurality of acoustic sensors; and a self-organizing mesh network of field mounted monitors having wireless communication circuitry configured to communicate wirelessly between devices on the self-organizing mesh network based upon detected hazardous noise.

22. The system of claim 21 including an interface used to set the configurable parameters.

23. The system of claim 21 including an interface configured to provide trending information.

24. The system of claim 21, wherein the detection of the specific hazardous noise condition is based on a user selectable noise duration.

25. The system of claim 21 including an interface implemented in a software application.

26. The system of claim 21 including a plurality of field mounted monitors.

27. The system of claim 21 wherein the processing circuitry is implemented by a software application run on a microprocessor.

28. A field mounted wireless field device for use in monitoring acoustic noise in an industrial process, comprising:
    an acoustic sensor at an industrial field mounted location, the acoustic sensor configured to sense acoustic noise in the industrial process;
    processing circuitry coupled to the acoustic sensor at the field mounted location and configured to identify a specific hazardous noise condition based upon the sensed acoustic noise; and
    output circuitry configured to connect to a self-organizing mesh network to provide an output on the self-organizing mesh network in response to the hazardous noise condition;
    wherein the processing circuitry identifies the specific hazardous noise condition based on a user selectable noise duration.

29. A method of monitoring acoustic noise, comprising:
    sensing acoustic noise with an acoustic sensor field mounted in a wireless field device at an industrial field mounted location;
    processing the sensed acoustic noise at the field mounted location to identify a specific hazardous noise condition;
    providing user selectable parameters of operation of the wireless field device including a noise duration;
    identifying a noise parameter in the processed acoustic noise based upon a personnel noise exposure standard and the noise duration; and
    providing a wireless output on a self-organizing mesh network based upon an identified noise parameter.

30. The method of claim 29, wherein processing the sensed acoustic noise further comprises filtering the noise by frequency and identifying the specific hazardous noise condition based on the filtered sensed acoustic noise.

31. The method of claim 30, wherein filtering by frequency comprises filtering using octave bands.

32. The method of claim 29, wherein processing the sensed acoustic noise further comprises weighting the sensed acoustic noise using a weighting curve and identifying the specific hazardous noise condition based on the weighted sensed acoustic noise.

33. The method of claim 29, wherein identifying a noise parameter further comprises configuring the processing using at least one criterion.

34. The method of claim 29, and further comprising:
    Identifying a hazardous noise condition based on the identified noise parameter; and
    providing a warning output in response to the identified hazardous noise condition.

* * * * *